J. B. STEARNS.

Duplex Telegraph Apparatus.

No. 5,344. Reissued April 1, 1873.

Witnesses.

A. L. Hayes.

William A. Hayes Jr.

Inventor.

J. B. Stearns.

THE NORRIS PETERS CO., PHOTO-LITHO., WASHINGTON, D. C.

UNITED STATES PATENT OFFICE.

JOSEPH B. STEARNS, OF BOSTON, MASSACHUSETTS, ASSIGNOR TO THE WESTERN UNION TELEGRAPH COMPANY.

IMPROVEMENT IN DUPLEX-TELEGRAPH APPARATUS.

Specification forming part of Letters Patent No. 126,847, dated May 14, 1872; reissue No. 5,314, dated April 1, 1873; application filed February 10, 1873.

*To all whom it may concern:*

Be it known that I, JOSEPH B. STEARNS, of the city of Boston, county of Suffolk, State of Massachusetts, have invented a new and useful Improvement in Telegraph Apparatus, of which the following is a specification:

This invention relates to duplex-telegraph apparatus, its object being to neutralize the effect of the return current from the line on the relay or receiving instrument when the line is put to earth; and to this effect the invention may, in general, be stated to consist in the mode of accomplishing this result by establishing, in a branch or compensating circuit connected to the circuit of the compensating-helix of the relay, during the time that the line is put to earth, a return current, which will neutralize the effect of the return current from the line upon the line-helix of the relay, substantially in the manner hereinafter described.

Figure 1:
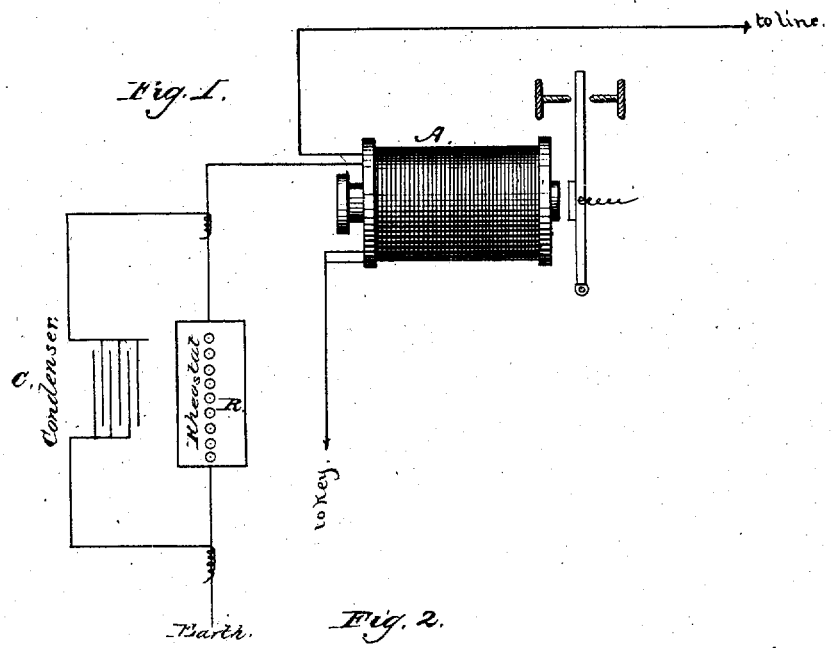
Figure 2:
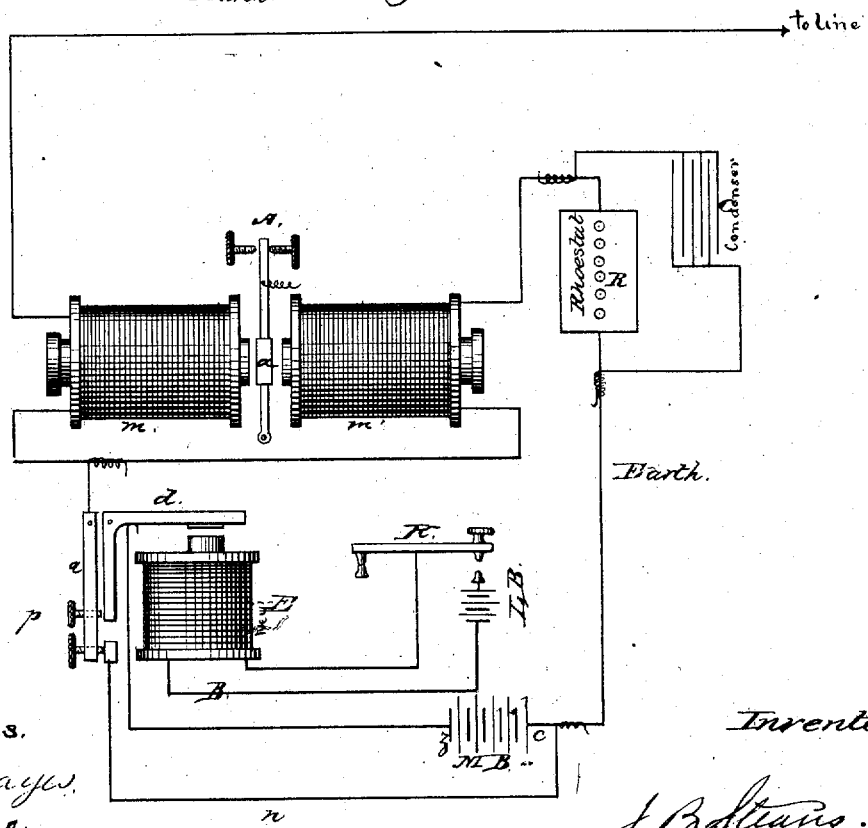

The accompanying drawing, forming part of this specification, represents an arrangement of apparatus adapted to carrying my invention into practical effect, in which Figure 1 is a diagram showing the combination of a condenser with one form of double-transmitting apparatus, and Fig. 2 a diagram showing the combination of a condenser with another form of the same.

As the apparatus at each terminal station is similar, the diagram represents the apparatus at one station only, A being the receiving instrument or relay; K, the key; R, the main resistance; M B, the main battery; and C, the condenser.

For the purpose of more clearly explaining my invention, I will first proceed to describe the construction and operation of a form of double-transmitting apparatus, selecting for that purpose the apparatus patented by me June 2, 1868, and numbered 78,548, which apparatus is represented in Fig. 2 of the drawing.

The conditions necessary for success in apparatus for the double transmission of signals are, first, having each relay at either station always in the circuit on the line; second, preventing the transmission of currents from either station from affecting the relay at that station; and, third, maintaining the resistance of the line always the same.

These conditions are fulfilled in the apparatus represented in the diagrams in the following manner:

In the apparatus represented in Fig. 2 of the drawing, and before referred to, the relay or receiving-instrument A consists of two electro-magnets *m m'* opposed to each other, and having an armature common to both. When the circuit is closed the current passes from the main battery M B to the key *d;* thence through back stop *p* to point *o*, where it divides, one portion passing through the electro-magnet *m* of the relay or receiving-instrument to the line, the other portion through the electro-magnet *m'* of the relay or receiving-instrument to a rheostat or resistance-coil, R, having the same or nearly the same resistance as the line, and thence to the earth. The electro-magnets *m m'*, being thus simultaneously excited by currents of the same strength, and being opposed, neutralize each other's effect upon the armature common to both, so that it does not move, and consequently no indication is given that a current is transmitted from the station; but when a current is transmitted from the distant station it passes through the magnet *m* only of the relay or receiving-instrument at the home station, and thence to the earth, but not through the magnet *m'* of the relay, on account of the resistance-coil between the relay and the earth, and consequently the equilibrium between the magnetic forces of the two magnets *m m'* is disturbed, and the armature is attracted by the stronger magnet.

It is thus seen that the relay or receiving-instrument at the home station responds only to the currents transmitted from the distant station, and not the currents transmitted from the station where it is situated; and consequently the two stations are enabled to send simultaneously, the respective relays at each station, though always in the circuit, responding only to the currents from the other station.

In operating this apparatus I prefer to use, instead of the ordinary finger-key, a key which is operated by an electro-magnet excited by a local battery, and controlled by an ordinary finger-key, as shown in Fig. 2, in which K is the finger-key; L B, the local battery; E, the electro-magnet; *d*, the armature-lever; *e*, a lever connected to the relay at *o*, and having two contact-screws, through which connections are made, one with the line, the other with the earth. On depressing the key K the lever *d* is attached, and the current passes from the main battery M B through *d p e* to *o*, where it divides, one portion passing through *m* to line, the other through *m'* and R to earth. When the key K is opened the lever *d* is released, and the line connected to earth through back-contact and wire *n*.

It is obviously a matter of great importance that the resistance presented by the apparatus at one station to the current from the opposite or remote station should always be perfectly uniform, irrespective of the position of the circuit-breaker. To effect this it is necessary that the resistance between the lever *a* and the earth by way of *e p* should be equal to that by way of *b d* M B. A small resistance, which is made equal to the internal resistance of the battery M B, is therefore interposed between the anvil *p* and the earth, as represented in the patents referred to. In Fig. 1 of the drawing I have represented another form of double-transmitting apparatus, also patented by me June 2, 1868, in which the neutralization of the effect of the divided currents is accomplished by providing the relay with two coils wound in opposite directions on the same core.

I will now proceed to explain the nature of my improvement.

It is a well-known phenomenon in the operation of the electric telegraph that a submarine subterranean, or long land-line wire, when well insulated, acquires, when connected with a battery, what is known as the "static charge," and that when the wire is disconnected with the battery and put to earth the discharge of this accumulated electricity gives rise to a return current in an opposite direction to the current from the battery. This current is found upon the lines referred to a serious obstacle to the successful operation of a double-transmitting apparatus, for when the battery at the sending station is disconnected and the line put to earth the relay or other receiving-instrument at that station, which, as has been before explained, should be perfectly quiet, is affected by the return current, which passes through the opposing magnets or coils of the relay, and disturbs the balance of the magnetic forces, therefore producing a momentary attraction of the armature, and a consequent confusion of the signals. To obviate this difficulty is the object of my invention, which consists in combining, with the branch or compensating circuit passing through one of the coils, or one of the magnets of the relay or other receiving-instrument, to the resistance, and thence to the earth, a condenser of any of the well-known forms in use, which receives a static charge at the same time as the line, when the latter is connected to the battery, and when the line is disconnected sends a return current, which neutralizes the effect of that coming from the line, and thus prevents the relay from being affected. The condenser is shown at C, as in Fig. 1 and Fig. 2. It may be made of alternate strips or plates of tin-foil and some insulating material.

I have shown the combination of a condenser with two forms of double-transmitting apparatus. I do not limit myself to its combination with these alone, as there are other forms of double-transmitting apparatus having a branch or compensating circuit in which a condenser can be used with the same effect and for the same purpose as that described.

What I claim as my invention, and desire to secure by Letters Patent of the United States, is—

1. In an apparatus for double transmission, the mode herein described of neutralizing the effect of the return current from the line when the line is put to earth by means of a return current traversing the branch or compensating circuit during this time, substantially as and for the purpose shown and set forth.

2. In an apparatus for double transmission, the combination of a condenser with a branch or compensating circuit, whereby the effect of static induction upon the receiving relay or instrument is counteracted, substantially as and for the purpose herein specified.

JOSEPH B. STEARNS.

Witnesses:
WILLIAM A. HAYES, Jr.,
A. L. HAYES.